US009219628B2

(12) United States Patent
Ye et al.

(10) Patent No.: US 9,219,628 B2
(45) Date of Patent: Dec. 22, 2015

(54) EQUALIZER AND OPERATING METHOD THEREOF

(71) Applicants: SK HYNIX INC., Icheon (KR); SNU R&DB FOUNDATION, Seoul (KR)

(72) Inventors: Seok-Min Ye, Seoul (KR); Deog-Kyoon Jeong, Seoul (KR)

(73) Assignees: SK HYNIX INC., Icheon (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 65 days.

(21) Appl. No.: 14/080,756

(22) Filed: Nov. 14, 2013

(65) Prior Publication Data

US 2014/0140385 A1 May 22, 2014

(30) Foreign Application Priority Data

Nov. 16, 2012 (KR) ........................ 10-2012-0130239

(51) Int. Cl.
*H04L 27/01* (2006.01)
*H04L 25/03* (2006.01)

(52) U.S. Cl.
CPC ........... *H04L 27/01* (2013.01); *H04L 25/03038* (2013.01); *H04L 25/03267* (2013.01); *H04L 25/03949* (2013.01); *H04L 2025/0349* (2013.01)

(58) Field of Classification Search
CPC ................. H04L 25/03057; H04L 25/03267; H04L 25/03949; H04L 27/01; H04L 25/03038; H04L 2025/0349
USPC ....................................................... 375/260
See application file for complete search history.

(56) References Cited

U.S. PATENT DOCUMENTS

| | | | |
|---|---|---|---|
| 7,606,302 B2 | 10/2009 | Mobin et al. | |
| 2006/0109940 A1* | 5/2006 | Beukema et al. | 375/350 |
| 2006/0188043 A1* | 8/2006 | Zerbe et al. | 375/346 |
| 2007/0025436 A1* | 2/2007 | Shumarayev et al. | 375/233 |
| 2007/0253475 A1* | 11/2007 | Palmer | H04L 7/041 375/229 |
| 2009/0245343 A1* | 10/2009 | Iyer et al. | 375/232 |

FOREIGN PATENT DOCUMENTS

KR   10-2011-0059220 A    6/2011

OTHER PUBLICATIONS

E-Hung Chen; Jihong Ren; Leibowitz, B.; Hae-Chang Lee; Qi Lin; Kyung Oh; Lambrecht, F.; Stojanovic, V.; Zerbe, J.; Yang, C.-K.K., "Near-Optimal Equalizer and Timing Adaptation for I/O Links Using a BER-Based Metric," Solid-State Circuits, IEEE Journal of, vol. 43, No. 9, pp. 2144,2156, Sep. 2008.*
Dehghan, H.; Weber, Charles, "Aided Decision Feedback Equalization for Wired Communication," Signals, Systems and Computers, 2005. Conference Record of the Thirty-Ninth Asilomar Conference on , vol., no., pp. 782,787, Oct. 28, 2005-Nov. 1, 2005.*

(Continued)

*Primary Examiner* — Ross Varndell

(57) ABSTRACT

An equalizer includes a sampler configured to sample an edge and data of an input signal or an induced signal obtained from the input signal, a clock generator configured to generate an edge clock used to decide sampling timing of the edge and a data clock used to decide sampling timing of the data based on the sampled edge and the sampled data, and a controller configured to control the sampling timing of the edge and the sampling timing of the data based on the sampled edge and the sampled data.

18 Claims, 6 Drawing Sheets

(56) References Cited

OTHER PUBLICATIONS

Yasuo Hidaka et al., "A 4-Channel 1.25-10.3 Gb/s Backplane Transceiver Macro with 35 dB Equalizer and Sign-Based Zero-Forcing Adaptive Control", IEEE Journal of Solid-State Circuits, Dec. 2009, pp. 3547-3559, vol. 44, IEEE.

Brian S. Leibowitz et al., "A 4.5Gb/s 10-Tap DFE Receiver with First Tap Partial Response, Spectrally Gated Adaptaion, and $2^{nd}$-Order Data-Filtered CDR", ISSCC 2007, Feb. 13, 2007, pp. 228-229 and 599, Session 12, IEEE.

Koon-Lun Jackie Wong et al., "Edge and Data Adaptive Equalization of Serial-Link Tranceivers", IEEE Journal of Solid-State Circuits, Sep. 2008, pp. 2157-2169, vol. 43, IEEE.

E-Hung Chen et al., "Near-Optimal Equalizer and Timing Adaptation for I/O Links Using a BER-Based Metric", IEEE Journal of Solid-State Circuits, Sep. 2008, pp. 2144-2156, vol. 43, IEEE.

Jihong Ren et al., "Performance Analysis of Edge-based DFE", IEEE Electrical Performance of Electronic Packaging, 2006, pp. 265-268, IEEE.

* cited by examiner

EQUALIZER AND OPERATING METHOD THEREOF

CROSS-REFERENCE TO RELATED APPLICATIONS

The present application claims priority of Korean Patent Application No. 10-2012-0130239, filed on Nov. 16, 2012, which is incorporated herein by reference in its entirety.

BACKGROUND

1. Field

Embodiments of the present invention relate to an equalizer and an operating method thereof, and more particularly, to an equalizer capable of removing post-cursor interference from serial data received from a communication channel, and an operating method thereof.

2. Description of the Related Art

A conventional equalizer uses a linear or non-linear scheme. The equalizer includes a decision feedback equalizer (DFE) which employs a least mean square (LMS) algorithm.

An equalizer employing a linear scheme may exhibit good performance in an environment with small jitter, but may increase noise. A DFE employing an LMS algorithm may diverge depending on operating points.

A DFE which decides data sampling timing through eye monitoring requires an excessively large space to store data quantized for the eye monitoring. As a result, the time it takes to perform a matching process increases.

SUMMARY

Embodiments of the present invention are directed to an equalizer capable of removing post-cursor interference, and an operating method thereof. Embodiments are also directed to an equalizer capable of reducing the matching time and the size of hardware, and an operating method thereof.

In an embodiment, an equalizer includes: a sampler configured to sample an edge and data of an input signal or an induced signal obtained from the input signal; a clock generator configured to generate an edge clock used to decide sampling timing of the edge and a data clock used to decide sampling timing of the data based on the sampled edge and the sampled data; and a controller configured to control the sampling timing of the edge and the sampling timing of the data based on the sampled edge and the sampled data.

The sampler may include: an edge sampler configured to sample the edge of the input signal or the induced signal in response to the edge clock; and a data sampler configured to sample the data of the input signal or the induced signal in response to the data clock.

The controller may include: a filter configured to generate a control signal from the sampled data and previously-sampled data; and a filter controller configured to control the filter based on the sampled edge and the sampled data.

The equalizer may include an operational unit configured to generate the induced signal based on the input signal and the control signal, wherein the sampler samples the edge and the data of the induced signal.

The operational unit may include a subtracter configured to subtract the control signal from the input signal.

The sampler may decide a value of the sampled edge and a value of the sampled data by comparing the edge and the data respectively with a threshold value adjusted according to the control signal.

The equalizer may further include a single flip-flop or two or more flip-flops connected in series to store the previously-sampled data.

The filter controller may control the filter based on the sampled edge and the sampled data, the sampled edge and the sampled data being stored for a predetermined time.

The clock generator may provide the sampled edge and the sampled data to the filter controller, the sampled edge and the sampled data being stored in the clock generator for the predetermined time.

The equalizer may further include a register configured to store sampled edges and sampled data outputted from the sampler for a predetermined time and provide the stored sampled edges and sampled data to the filter controller.

The filter controller may control the filter based on a number of first cases in which the control signal is controlled to be positive and a number of second cases in which the control signal is controlled to be negative, wherein the first case and the second case are determined based on the stored sampled edges and sampled data.

The data may include post-cursor information.

In an embodiment, an operating method of an equalizer includes: determining whether or not a matching condition is satisfied based on a sampled edge and sampled data obtained by sampling an edge and data of an input signal or an induced signal obtained from the input signal; and changing a sampling timing of the edge and a sampling timing of the data based on the sampled edge and the sampled data if it is determined that the matching condition is not satisfied.

The changing of the sampling timing may include: generating a control signal by filtering the sampled data and at least one previously-sampled data; adjusting the control signal based on the sampled edge and the sampled data; and adjusting the sampling timing of the edge and the sampling timing of the data in response to the control signal.

The adjusting may include: generating the induced signal by subtracting the control signal from the input signal; generating the sampled edge and the sampled data by sampling the induced signal; and generating a clock signal used to decide the sampling timing of the edge and the sampling timing of the data based on the sampled edge and the sampled data.

The adjusting may include: generating a new sampled edge and new sampled data by comparing the sampled edge and the sampled data with a threshold value, the threshold value being adjusted according to the control signal; and generating a clock signal used to decide the sampling timing of the edge and the sampling timing of the data based on the new sampled edge and the new sampled data.

The determining may include: storing sampled edges and sampled data for a predetermined time; calculating a number of first cases in which the control signal is adjusted to be positive based on the stored sampled edges and sampled data; calculating a number of second cases in which the control signal is adjusted to be negative based on the stored sampled edges and sampled data; and determining whether or not the matching condition is satisfied based on whether a difference between the number of first cases and the number of second cases is equal to or less than a first critical point, the first critical point being an integer equal to or larger than 0.

The first case may include a case in which values of the sampled data and the sampled edge are equal to each other, and the second case comprises a case in which the values of the sampled data and the sampled edge are different from each other.

The determining may include: storing the sampled edge and the sampled data for a predetermined time; and determining whether or not the matching condition is satisfied based on whether a difference between a number of cases in which a value of the sampled edge is 0 and a number of cases in which the value of the sampled edge is 1 is equal to or less than a second critical point, which is an integer equal to or less than 0, when a value of the sampled data is 1, and whether a difference between a number of cases in which the value of the sampled data is 0 and a number of cases in which the value of the sampled data is 1 is equal to or less than a third critical point, which is an integer equal to or less than 0, when the value of the sampled data is 0.

In an embodiment, there is provided an operating method of an equalizer, which sequentially performing a process of removing an influence of a first post cursor to a process of removing an influence of an N-th post cursor in order to remove the influence of N post cursors, where N is a positive integer, wherein a process of removing the influence of a K-th post cursor comprises: determining whether or not a matching condition is satisfied based on a sampled edge, which is obtained by sampling an edge of an input signal or an induced signal obtained from the input signal, and a K-th post cursor; and changing sampling timing of the edge and sampling timing of the K-th post cursor based on the sampled edge and the K-th post cursor when it is determined that the matching condition is not satisfied, and wherein N is a positive integer, and K is a positive integer equal to or less than N.

In an embodiment, there is provided a computer-readable medium for storing processor-executable steps which comprise: determining whether or not a matching condition is satisfied based on a sampled edge and sampled data obtained by sampling an edge and data of an input signal or an induced signal obtained from the input signal; and generating a control signal for adjusting sampling timing of the edge and sampling timing of the data based on the sampled edge and the sampled data when it is determined that the matching condition is not satisfied.

DETAILED DESCRIPTION

Figure 1:
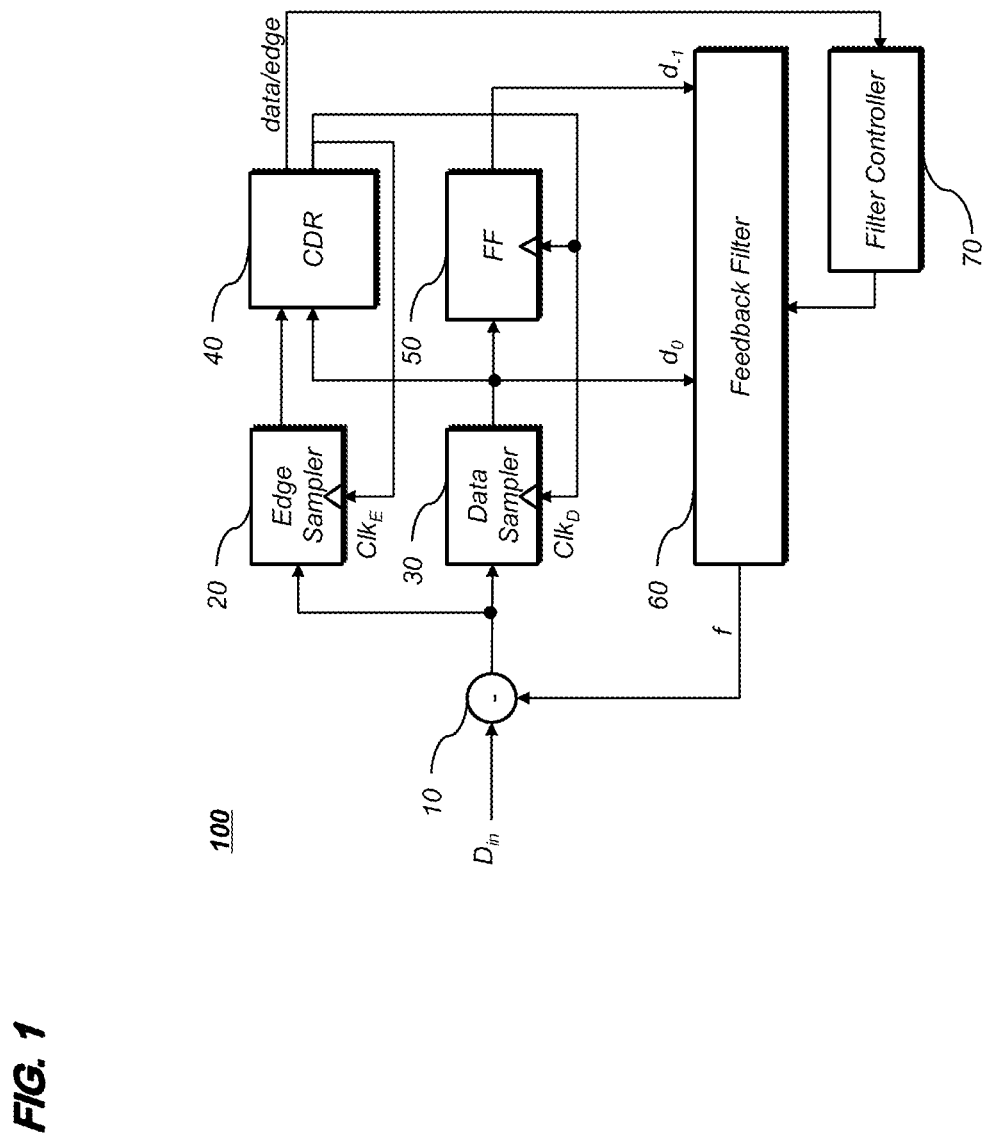
FIG. 1 is a block diagram illustrating an equalizer in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating an equalizer 100 in accordance with an embodiment of the present invention.

The equalizer 100 includes a subtracter 10, an edge sampler 20, a data sampler 30, a clock and data recovery (CDR) circuit 40, a flip-flop (FF) 50, a feedback filter 60, and a filter controller 70.

The subtracter 10 is configured to subtract a feedback signal f from an input signal Din. FIG. 1 illustrates only one subtracter 10, but embodiments are not limited thereto. In another embodiment, the equalizer 100 includes a plurality of subtracters. Each of the subtracters may subtract the feedback signal f outputted from the feedback filter 60 from the input signal Din and provide resulting data to any one of the samplers 20 and 30. In an embodiment, the feedback signal f provided to each of the subtracters may be set so that they are different from each other.

The edge sampler 20 is configured to sample an edge of an output signal of the subtracter 10 in response to an edge clock $Clk_E$ outputted from the CDR circuit 40. The edge sampler 20 compares the edge of the output signal of the subtracter 10 with a threshold value and determines the sampled edge as 0 or 1 based on the comparison result.

The data sampler 30 is configured to sample data of the output signal of the subtracter 10 in response to a data clock $Clk_D$ outputted from the CDR circuit 40. The data sampler 30 compares the data of the output signal of the subtracter 10 with the threshold value and determines the sampled data as 0 or 1 based on the comparison result. After the matching operation is completed, an output $d_0$ of the data sampler 30 may be used as output data of the equalizer 100.

The CDR circuit 40 is configured to output a plurality of clocks having the same frequency and different phases. One part of the clocks may be used as data clocks, and the other part of the clocks may be used as edge clocks. In an embodiment, the CDR circuit 40 outputs four clocks having phases of 0, 90, 180, and 270 degrees, respectively. Among the four clocks, the clocks having the phases of 0 and 180 degrees may be used as the data clocks, and the clocks having the phases of 90 and 270 degrees may be used as the edge clocks.

In FIG. 1, the CDR circuit 40 is configured to generate the edge clock $Clk_E$, the data clock $Clk_D$, and data and edge information (i.e., data/edge information) based on outputs, e.g., the sampled edge and the sampled data, from the edge sampler 20 and the data sampler 30, respectively. The CDR circuit 40 may include a phase comparator, a frequency comparator, and the like. The CDR circuit stores the sampled data and the sampled edge for a predetermined period and outputs parallel data/edge information using the stored sampled data and stored sampled edge. Since a CDR circuit is a well-known component, detailed descriptions of a process of outputting the clocks and the data/edge information, which is performed by the CDR circuit 40, are omitted herein.

Figure 2:
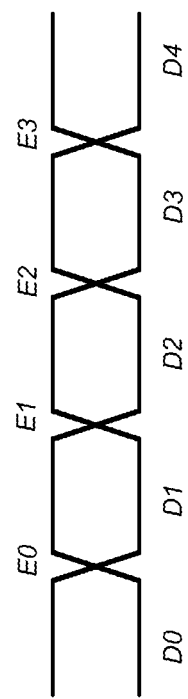
FIG. 2 is a diagram illustrating data and edges of an input signal.

FIG. 2 illustrates data and edges of the input signal Din. In FIG. 2, data is represented by D1, D2, D3, and D4, and edges are represented by E0, E1, E2, and E3.

The flip-flop 50 stores and outputs previously-sampled data $d_{-1}$ in response to the data clock $Clk_D$ outputted from the CDR circuit 40. FIG. 1 illustrates one flip-flop 30, but embodiments are not limited thereto. In another embodiment, the equalizer 100 includes two or more flip-flops connected in series. For example, if (n−1) flip-flops exist, the flip-flops may output data $d_{-1}, \ldots,$ and $d_{-(n-1)}$.

The feedback filter 60 is configured to generate the feedback signal f based on the output $d_0$ of the data sampler 30 and the output $d_{-1}$ of the flip-flop 50.

In the above-described embodiment, in which the equalizer 100 includes the plurality of subtracters, the feedback filter 60 may output a plurality of feedback signals for the respective subtracters.

The filter controller 70 is configured to control the feedback filter 50 to adjust the feedback signal f based on the data/edge information outputted from the CDR circuit 40. For this operation, the filter controller 70 may control a filtering coefficient of the feedback filter 60.

In another embodiment, the filter controller 70 directly receives the sampled data and the sampled edge, i.e., sampled data/edge information, output from the data sampler 30 and the edge sampler 20. The sampled data/edge information outputted from the samplers 20 and 30 corresponds to high-speed serial data.

When the filter controller 70 cannot process each bit of the sampled data/edge information in real time due to, for example, a processing speed, the filter controller 70 may store serial data by 10 bits or 20 bits for a predetermined time, and perform its operation using the stored information. For this operation, the equalizer 100 may further include a register (not illustrated) that is provided inside or outside the filter controller 70 and configured to store the data/edge information from the CDR circuit 40 or the samplers 20 and 30.

Through an operation of the filter controller 70, noise caused by the influence of a post cursor, i.e., post-cursor interference, is removed. A process of removing the influence of a post cursor through an operation of a filter controller will be described in detail with reference to the flowcharts of FIGS. 3 to 6. In addition, for convenience of description, embodiments will be described with reference to the components shown in FIG. 1.

Figure 3:
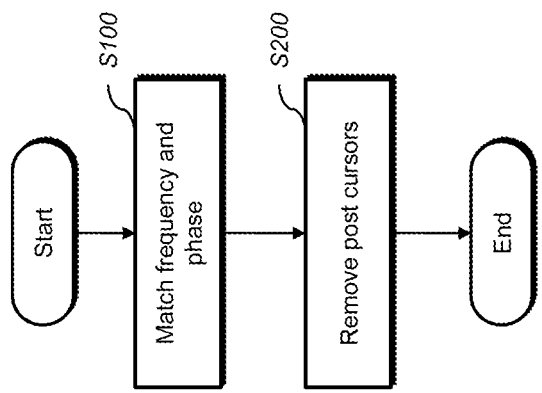
FIG. 3 is a flowchart illustrating an operating method of an equalizer in accordance with an embodiment of the present invention.

FIG. 3 is a flowchart illustrating an operating method of an equalizer, e.g., equalizer 100, in accordance with an embodiment of the present invention.

The operating method of the equalizer 100 includes a frequency and phase matching step S100 and a post-cursor removal step S200.

The frequency and phase matching step S100 is performed in the CDR circuit 40 at an initial stage before the filter controller 70 operates. At the frequency and phase matching step S100, clocks $Clk_E$ and $Clk_D$ and data/edge information are outputted from the CDR circuit 40.

When the frequency and phase matching step S100 is performed, a sampling position of an edge is located at the mid-point (50%) of a sampling position of data. That is, the edge clock $Clk_E$ has an intermediate phase between those of two adjacent data clocks $Clk_D$.

Then, the post-cursor removal step S200 is performed. When there is a plurality of post cursors having an influence on noise, the post cursors may be removed one by one.

Figure 4:
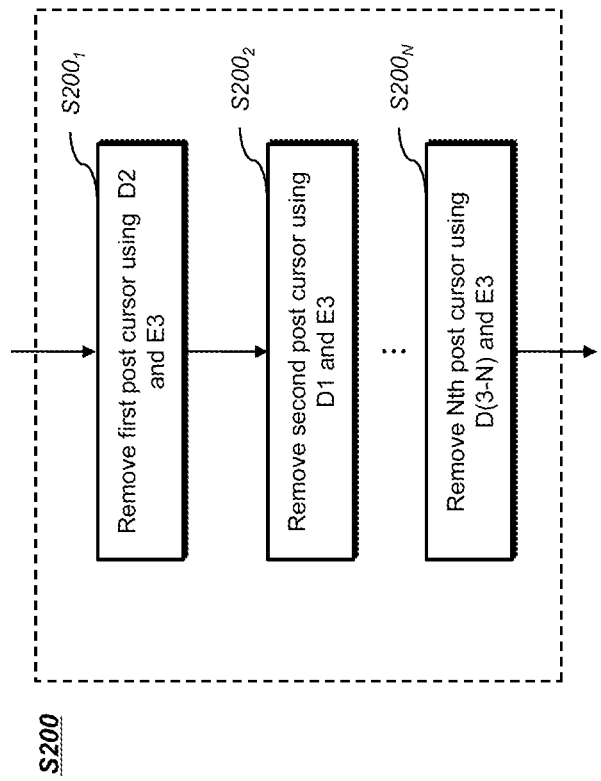
FIG. 4 is a flowchart illustrating a process of removing a plurality of post cursors in accordance with an embodiment of the present invention.

FIG. 4 is a flowchart illustrating a process of performing a post-cursor removal step S200 in accordance with an embodiment of the present invention.

In an embodiment, if N post cursors exist, the post-cursor removal process includes N steps, each of which removes a corresponding one of the N post cursors. That is, as shown in FIG. 4, the post-cursor removal process S200 includes step $S200_1$ of removing a first post cursor, step $S200_2$ of removing a second post cursor, ..., and step $S200_N$ of removing an N-th post cursor.

Referring to FIG. 2, for the edge E3, the first post-cursor influence is due to the data D2, the second post-cursor influence is due to the data D1, and the N-th post-cursor influence is due to the data D(3-N).

The filter controller 70 uses the data D2 and the edge E3 to remove the first-post cursor influence, uses the data D1 and the edge E3 to remove the second post cursor influence, and uses the data D(3-N) and the edge E3 to remove the N-th post cursor influence.

Figure 5:
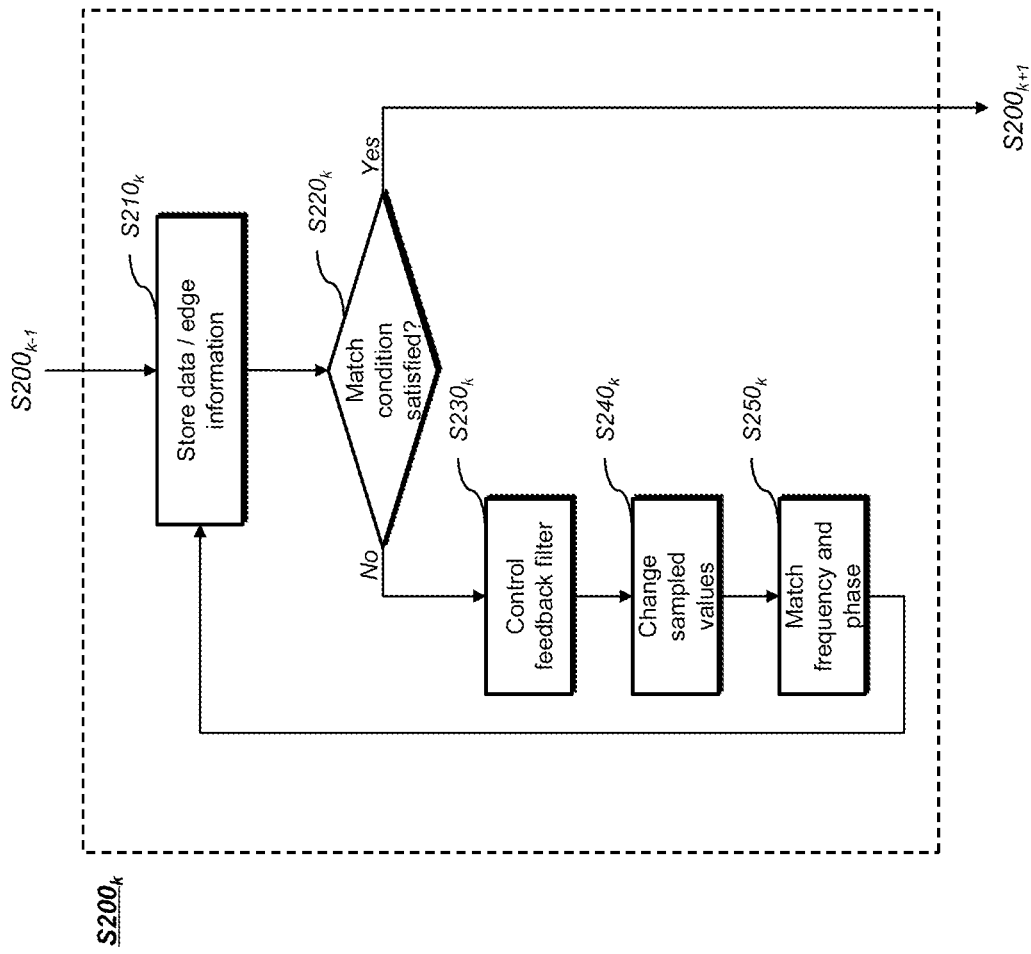
FIG. 5 is a flowchart illustrating a process of removing a k-th post cursor in accordance with an embodiment of the present invention.

FIG. 5 is a flowchart illustrating step $S200_k$ of removing a k-th post cursor (1<k<N). Step $S200_1$ of removing the first post cursor and the step $S200_N$ of removing the N-th post cursor are performed in substantially the same manner. Step $S200_1$ starts after step S100 and the post-cursor removal process is ended after step $S200_N$.

Step $S200_K$ of removing the k-th post cursor is performed after step $S200_{k-1}$ of removing a (k−1)-th post cursor.

In order to remove the k-th post cursor, data/edge information is stored for a predetermined time at step $S210_k$. When information is stored for a short time, noise increases, and when the information is stored for a long time, the entire matching time increases. Thus, an optimal time may be selected therebetween by a person skilled in the art.

The method for storing the data/edge information may change depending on embodiments. Since the CDR circuit 40 stores data/edge information to provide parallel data, the parallel data/edge information outputted from the CDR circuit 40 may be used for the post-cursor removal process in the present embodiment.

In another embodiment, serial data/edge information outputted from the samplers 20 and 30 is stored in a separate register for a predetermined period, and then used.

For example, the data/edge information stored for a predetermined period may be summarized as in the following table.

TABLE 1

|  | Edge 0 | Edge 1 |
|---|---|---|
| Post cursor 0 | a | b |
| Post cursor 1 | c | d |

In Table 1, a, b, c, and d are integers equal to or larger than 0, and each of a, b, c, and d represents the number of cases that satisfy the matching of the sampled edge and the sampled data. For example, 'a' represents number of occurrences where the edge is determined as 0 when the post cursor is 0.

At step $S220_k$, whether or not a matching condition is satisfied is determined based on the data/edge information stored in the above-described manner.

For example, according to a one matching condition (i.e., a first matching condition), the number l of cases in which the feedback signal f is controlled to be positive is equal to the number m of cases in which the feedback signal f is controlled to be negative (l=m).

According to another matching condition (i.e., a second matching condition), a difference between the number l of cases in which the feedback signal f is controlled to be positive and the number m of cases in which the feedback signal f is controlled to be negative is equal to or less than a critical value $\Delta$ ($|l-m| \leq \Delta$).

The case in which the feedback signal f is controlled to be positive and the case in which the feedback signal f is controlled to be negative may be determined as shown in the following table.

TABLE 2

|  | Edge 0 | Edge 1 |
|---|---|---|
| Post cursor 0 | positive | negative |
| Post cursor 1 | negative | positive |

Based on Table 1 and Table 2, at the first and second matching conditions, the number 1 of cases in which the feedback signal f is controlled to be positive is equal to the sum of a and d, and the number m of cases in which the feedback signal f is controlled to be negative is equal to the sum of b and c.

For example, according to another matching condition (i.e., a third matching condition), when the post cursor is 1, the number of cases in which the edge is determined as 1 is equal to the number of cases in which the edge is determined as 0. Simultaneously, when the post cursor is 0, the number of cases in which the edge is determined as 1 is equal to the number of cases in which the edge is determined as 0 (a=b and c=d).

According to another matching condition (i.e., a fourth matching condition), when the post cursor is 1, a difference between the number of cases in which the edge is determined as 1 and the number of cases in which the edge is determined as 0 is equal to or less than a critical value $\Delta_1$, and when the post cursor is 0, a difference between the number of cases in which the edge is determined as 1 and the number of cases in which the edge is determined as 0 is equal to or less than a critical value $\Delta_2$ ($|a-b|\leq\Delta_1$ and $|c-d|\leq\Delta_2$).

In other embodiments, other matching conditions may be used instead of the above-described matching conditions.

When it is determined that the matching condition is satisfied, step $S200_k$ of removing the k-th post cursor is ended, and the procedure proceeds to step $S200_{k+1}$ of removing a (k+1)-th post cursor.

When it is determined that the matching condition is not satisfied, the filter controller 70 controls the feedback filter 60 to change the feedback signal f at step $S230_k$.

The feedback signal f, which changes according to the control of the filter controller 70, may vary depending on embodiments. However, while the loop of FIG. 5 is repeated, the feedback signal f may be changed so as to gradually converge into the matching condition.

For example, when the first matching condition is used, the filter controller 70 may control the feedback filter 60 to output a positive value if (a+d) is larger than (b+c) (a+d>b+c) and to output a negative value if (a+d) is smaller than (b+c) (a+d<b+c), at step $S230_k$.

A person skilled in the art may will understand that a variation range of the output of the feedback filter 60, i.e., the feedback signal f, may be determined by considering the difference (|(a+d)−(b+c)|), a noise condition, a circuit implementation technology, a loop repetition number, and the like.

If the feedback signal f is changed, sampled values output from the edge sampler 20 and the data sampler 30 may be changed at step $S240_k$.

Thus, the CDR circuit 40 performs a new phase matching process and a new frequency matching process based on the changed sampled values from the edge sampler 20 and the data sampler 30, and outputs a changed data clock $Clk_D$ and a changed edge clock $Clk_E$ as results of the new phase matching process and the new frequency matching process. Therefore, the data sampling timing and the edge sampling timing are changed at step $S250_k$.

When step $S250_k$ ends, new data/edge information is stored for a predetermined period at step $S210_k$, and the above-described process is repeated until the matching condition is satisfied.

Step $S220_k$ of determining whether the matching condition is satisfied and step $S230_k$ of controlling the feedback filter 60 in FIG. 5 may be stored in a volatile or nonvolatile memory and are then executed by a processor.

Figure 6:
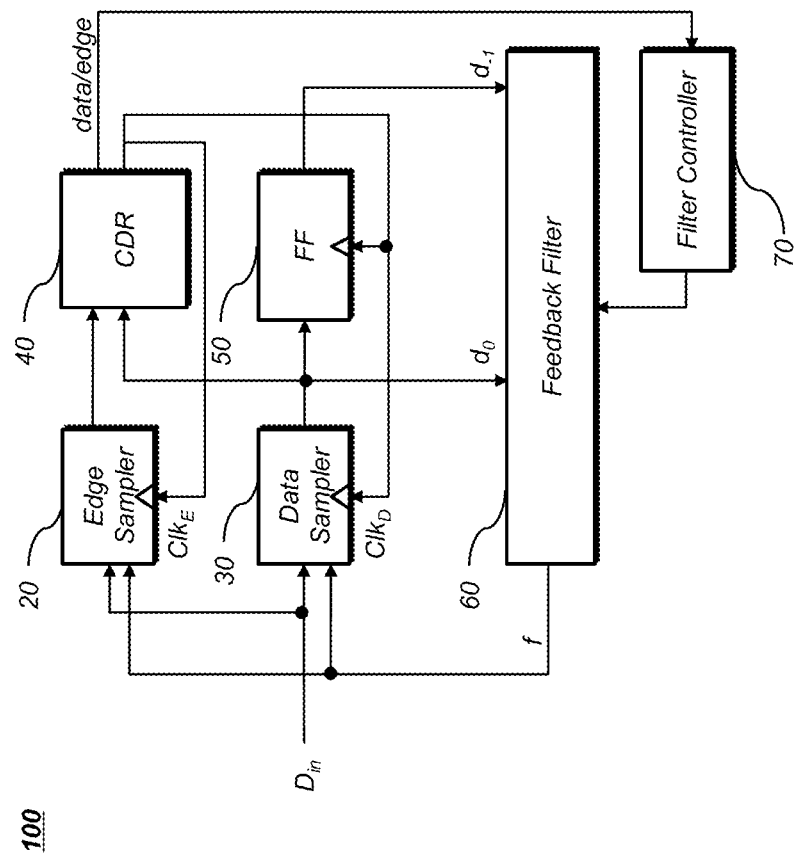
FIG. 6 is a block diagram illustrating an equalizer in accordance with another embodiment of the present invention.

FIG. 6 is a block diagram illustrating an equalizer in accordance with another embodiment of the present invention.

In an embodiment of FIG. 1, the edge sampler 20 and the data sampler 30 sample an induced signal. The induced signal is obtained by subtracting the feedback signal f from the input signal Din. The induced signal is compared with a threshold value to determine the edge and data of the induced signal as 0 or 1. If a matching condition is not satisfied, the feedback signal f is changed, and thus the induced signal is changed by the changed feedback signal.

On the other hand, in the embodiment of FIG. 6, the feedback signal f is provided directly to the samplers 20 and 30 and changes a threshold value used by the edge sampler 20 and the data sampler 30. That is, the edge sampler 20 and the data sampler 30 generate a new threshold value based on a fixed threshold value and a control signal, i.e., the feedback signal f. If the matching condition is not satisfied, the feedback signal f is changed, and the edge sampler 20 and the data sampler 30 compares the edge and data of the input signal Din with the new threshold value that is generated based on the changed feedback signal and determines the sampled edge and data as 0 or 1.

In an embodiment, the same feedback signal f is used in the respective samplers 20 and 30. In another embodiment, different feedback signals may be provided to the respective samplers 20 and 30. In this case, the feedback filter 60 generates separate feedback signals for the respective samplers 20 and 30.

In an embodiment, the standard for setting the feedback signal f may be changed in a different manner than that demonstrated in Table 2, depending on the calculation method for generating a new threshold value. For example, when a value that is obtained by subtracting the feedback signal f from the fixed threshold value is determined as the new threshold value, the sign of the feedback signal f may be changed in an opposite manner to that shown in Table 2.

Since functions of the other components illustrated in FIG. 6 and an operating method of an equalizer described with reference to FIGS. 3 to 5 may be applied in substantially the same manner as an embodiment of FIG. 6, detailed descriptions thereof are omitted herein.

In accordance with embodiments of the present invention, an equalizer may quickly remove the influence of a post cursor while minimizing a storage space of data.

Although various embodiments have been described for illustrative purposes, it will be apparent to those skilled in the art that various changes and modifications may be made without departing from the spirit and scope of the invention as defined in the following claims.

What is claimed is:

1. An equalizer comprising:
   a sampler configured to sample an edge and data of an input signal or an induced signal obtained from the input signal;
   a clock generator configured to generate an edge clock used to decide sampling timing of the edge and a data clock used to decide sampling timing of the data based on the sampled edge and the sampled data; and
   a controller configured to control the sampling timing of the edge and the sampling timing of the data based on the sampled edge and the sampled data,
   wherein the controller comprises:
      a feedback filter configured to generate a control signal from the sampled data and previously-sampled data; and
      a filter controller configured to control the feedback filter based on the sampled edge and the sampled data.

2. The equalizer of claim 1, wherein the sampler comprises:
- an edge sampler configured to sample the edge of the input signal or the induced signal in response to the edge clock; and
- a data sampler configured to sample the data of the input signal or the induced signal in response to the data clock.

3. The equalizer of claim 1, further comprising an operational unit configured to generate the induced signal based on the input signal and the control signal,
wherein the sampler samples the edge and the data of the induced signal.

4. The equalizer of claim 3, wherein the operational unit comprises a subtractor configured to subtract the control signal from the input signal.

5. The equalizer of claim 3, wherein the filter controller controls the feedback filter based on the sampled edge and the sampled data, the sampled edge and the sampled data being stored for a predetermined time.

6. The equalizer of claim 5, wherein the clock generator provides the sampled edge and the sampled data to the filter controller, the sampled edge and the sampled data being stored in the clock generator for the predetermined time.

7. The equalizer of claim 5, wherein the filter controller controls the feedback filter based on a number of first cases in which the control signal is controlled to be positive and a number of second cases in which the control signal is controlled to be negative, wherein the first case and the second case are determined based on the stored sampled edges and sampled data.

8. The equalizer of claim 1, wherein the sampler decides a value of the sampled edge and a value of the sampled data by comparing the edge and the data respectively with a threshold value adjusted according to the control signal.

9. The equalizer of claim 1, further comprising a single flip-flop or two or more flip-flops connected in series to store the previously-sampled data.

10. The equalizer of claim 1, further comprising a register configured to store sampled edges and sampled data outputted from the sampler for a predetermined time and provide the stored sampled edges and sampled data to the filter controller.

11. The equalizer of claim 1, wherein the data comprises post-cursor information.

12. An operating method of an equalizer, the method comprising:
- determining whether or not a matching condition is satisfied based on a sampled edge and sampled data obtained by sampling an edge and data of an input signal or an induced signal obtained from the input signal; and
- changing a sampling timing of the edge and a sampling timing of the data based on the sampled edge and the sampled data if it is determined that the matching condition is not satisfied,
wherein the changing the sampling timing comprises:
- generating a control signal by filtering the sampled data and at least one previously-sampled data;
- adjusting the control signal based on the sampled edge and the sampled data; and
- adjusting the sampling timing of the edge and the sampling timing of the data in response to the control signal.

13. The operating method of claim 12, wherein the adjusting comprises:
- generating the induced signal by subtracting the control signal from the input signal;
- generating the sampled edge and the sampled data by sampling the induced signal; and
- generating a clock signal used to decide the sampling timing of the edge and the sampling timing of the data based on the sampled edge and the sampled data.

14. The operating method of claim 12, wherein the adjusting comprises:
- generating a new sampled edge and new sampled data by comparing the sampled edge and the sampled data with a threshold value, the threshold value being adjusted according to the control signal; and
- generating a clock signal used to decide the sampling timing of the edge and the sampling timing of the data based on the new sampled edge and the new sampled data.

15. The operating method of claim 12, wherein the determining comprises:
- storing sampled edges and sampled data for a predetermined time;
- calculating a number of first cases in which the control signal is adjusted to be positive based on the stored sampled edges and sampled data;
- calculating a number of second cases in which the control signal is adjusted to be negative based on the stored sampled edges and sampled data; and
- determining whether or not the matching condition is satisfied based on whether a difference between the number of first cases and the number of second cases is equal to or less than a first critical point, the first critical point being an integer equal to or larger than 0.

16. The operating method of claim 15, wherein the first case comprises a case in which values of the sampled data and the sampled edge are equal to each other, and the second case comprises a case in which the values of the sampled data and the sampled edge are different from each other.

17. The operating method of claim 12, wherein the determining comprises:
- storing the sampled edge and the sampled data for a predetermined time; and
- determining whether or not the matching condition is satisfied based on whether a difference between a number of cases in which a value of the sampled edge is 0 and a number of cases in which the value of the sampled edge is 1 is equal to or less than a second critical point, which is an integer equal to or less than 0, when a value of the sampled data is 1, and whether a difference between a number of cases in which the value of the sampled data is 0 and a number of cases in which the value of the sampled data is 1 is equal to or less than a third critical point, which is an integer equal to or less than 0, when the value of the sampled data is 0.

18. An operating method of an equalizer, the method comprising:
- performing a process of removing an influence of a first post cursor to a process of removing an influence of an N-th post cursor in order to remove the influence of N post cursors,
wherein a process of removing the influence of a K-th post cursor comprises:
- determining whether or not a matching condition is satisfied based on a M-th sampled edge, which is obtained by sampling an edge of an input signal or an induced signal obtained from the input signal, and (M−K)-th sampled data, which is obtained by sampling data of the input signal or the induced signal; and
- changing sampling timing of the edge and sampling timing of the data based on the M-th sampled edge and the (M−K)-th sampled data when it is determined that the matching condition is not satisfied, and wherein N is a positive integer, K is a positive integer less than N, and M is an arbitrary positive integer equal to or larger than K.

* * * * *